United States Patent
Loprieno et al.

(10) Patent No.: US 11,569,924 B2
(45) Date of Patent: Jan. 31, 2023

(54) ACCESS POINT IDENTIFIERS IN 400ZR AND 400ZR+ PROTOCOLS

(71) Applicant: Cisco Technology, Inc., San Jose, CA (US)

(72) Inventors: Gilberto Loprieno, Milan CAP (IT); Stefano Binetti, Monza (IT); Paolo Sironi, Gallarate (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 17/240,488

(22) Filed: Apr. 26, 2021

(65) Prior Publication Data
US 2022/0345239 A1    Oct. 27, 2022

(51) Int. Cl.
| | |
|---|---|
| *H04J 3/16* | (2006.01) |
| *H04W 72/04* | (2009.01) |
| *H04L 5/00* | (2006.01) |
| *H04J 14/00* | (2006.01) |
| *H04J 3/14* | (2006.01) |

(52) U.S. Cl.
CPC ............. *H04J 3/1658* (2013.01); *H04J 3/14* (2013.01); *H04J 14/005* (2013.01); *H04J 2203/006* (2013.01); *H04J 2203/0051* (2013.01); *H04J 2203/0058* (2013.01)

(58) Field of Classification Search
None
See application file for complete search history.

(56) References Cited

U.S. PATENT DOCUMENTS

| | | | |
|---|---|---|---|
| 10,750,260 B1 | 8/2020 | Gareau | |
| 11,418,313 B1 * | 8/2022 | Sluyski | ............. H03M 13/2909 |
| 2009/0254794 A1 * | 10/2009 | Malik | ...................... H04L 5/006 |
| | | | 714/776 |

(Continued)

FOREIGN PATENT DOCUMENTS

| | | |
|---|---|---|
| WO | 2019047110 A1 | 3/2019 |
| WO | 2020231877 A1 | 11/2020 |

OTHER PUBLICATIONS

"Implementation Agreement 400ZR," OIF, Mar. 10, 2020, 100 pages.

(Continued)

*Primary Examiner* — Sai Aung
(74) *Attorney, Agent, or Firm* — Edell, Shapiro & Finnan, LLC

(57) ABSTRACT

A first network element includes trail trace identifier information in an optical network frame. The first network element obtains data to transmit over an optical network link to a second network element. The first network element generates an optical network frame with alignment marker bytes, which are followed by padding bytes. The optical network frame also includes overhead bytes following the padding bytes. The overhead bytes include a Multi-Frame Alignment Signal (MFAS) byte, a link status byte, and reserved bytes. The optical network frame also includes a payload bytes following the overhead bytes. The payload bytes encode at least a portion of the data to transmit to the second network element. The first network element inserts trail trace identifier information into the reserved bytes in the overhead bytes. The trail trace identifier information identifies the first network element as a source of the optical network frame.

20 Claims, 7 Drawing Sheets

(56) References Cited

U.S. PATENT DOCUMENTS

| | | | | |
|---|---|---|---|---|
| 2012/0278498 A1* | 11/2012 | Zink | ................ | H04N 21/8456 |
| | | | | 709/231 |
| 2013/0191706 A1* | 7/2013 | Zopf | ..................... | H04L 1/005 |
| | | | | 714/776 |
| 2014/0308038 A1* | 10/2014 | Zheng | ............... | H04Q 11/0067 |
| | | | | 398/68 |
| 2016/0261339 A1 | 9/2016 | Kitamura et al. | | |
| 2018/0077171 A1* | 3/2018 | Ramanujan | ........ | H04L 63/1483 |
| 2020/0280371 A1* | 9/2020 | Su | ..................... | H04Q 11/0062 |
| 2020/0366412 A1 | 11/2020 | Wu et al. | | |

OTHER PUBLICATIONS

"Interfaces for the optical transport network," International Telecommunication Union, Telecommunication Standardization Sector of ITU, G.709/Y.1331, Feb. 2012, 238 pages.

Gorshe, Steve, "The Evolution of ITU-T G.70p Optical Transport Networks (OTN) Beyond 100Gbits/s," Microsemi, Mar. 2017, 56 pages.

* cited by examiner

ACCESS POINT IDENTIFIERS IN 400ZR AND 400ZR+ PROTOCOLS

TECHNICAL FIELD

The present disclosure relates to optical networking, particularly transport protocols for optical networks.

BACKGROUND

Optical Transport Network (OTN) frames use a Trail Trace Identifier (TTI) to identify the source and destination of the frame within the optical network. The TTI typically includes a 16-byte Source Access Point Identifier (SAPI), a 16-byte Destination Access Point Identifier (DAPI), and 32 bytes that are specific to the operator of the optical network. The SAPI and DAPI typically include information regarding country of origin, network operator, and other administrative details.

The FlexO protocol evolved based on transporting OTN frames and does not support TTI or equivalent source/destination identifiers, since the transported OTN frame already includes the TTI. Frames in the FlexO protocol may also be used by other applications, including by 400ZR and 400ZR+ applications. The 400ZR and 400ZR+ protocol leverage the FlexO frame as defined by the G.709.1 standard, but do not necessarily transport OTN traffic or the TTI included in OTN frames.

DESCRIPTION OF EXAMPLE EMBODIMENTS

Overview

A method is provided for including trail trace identifier information in an optical network frame. The method includes obtaining data at a first network element to transmit over an optical network link to a second network element. The method also includes generating an optical network frame comprising a plurality of alignment marker bytes, which are followed by a plurality of padding bytes. The optical network frame also includes a plurality of overhead bytes following the plurality of padding bytes. The plurality of overhead bytes include an MFAS byte, a link status byte, and a plurality of reserved bytes. The optical network frame also includes a plurality of payload bytes following the plurality of overhead bytes. The plurality of payload bytes encode at least a portion of the data to transmit to the second network element. The method further includes inserting trail trace identifier information into the plurality of reserved bytes in the plurality of overhead bytes. The trail trace identifier information identifies the first network element as a source of the optical network frame.

Example Embodiments

The techniques described herein replace reserved bytes of FlexO, 400ZR, and 400ZR+ frames with TTI to enable the optical network to identify the TTI of optical network frames that do not transport OTN frames with TTI. The TTI described herein may vary between 14 and 64 bytes, depending on the placement of the TTI within the optical network frame.

Figure 1:
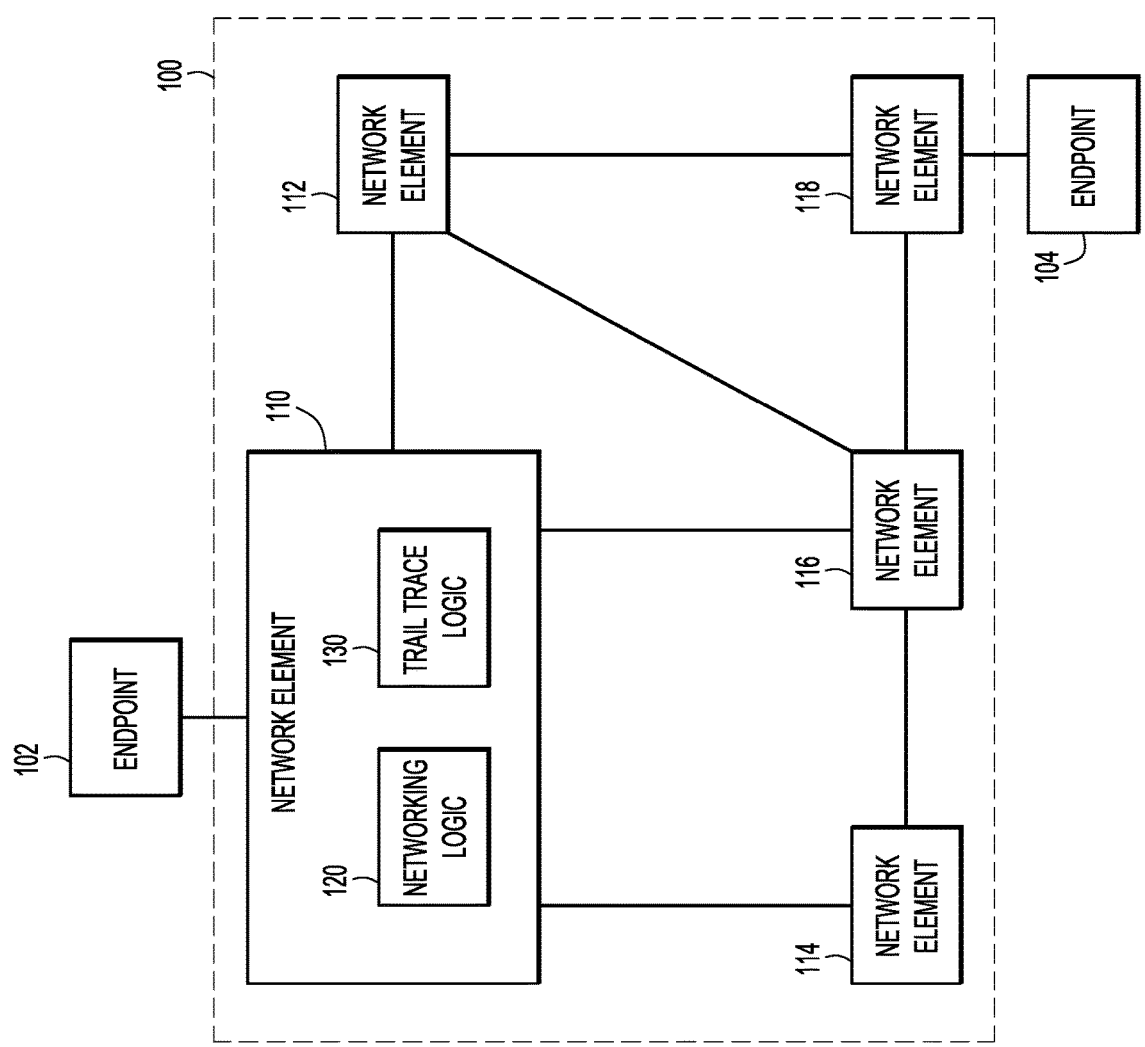
FIG. 1 is a simplified block diagram of an optical network system that transports optical frames with TTI, according to an example embodiment.

Referring now to FIG. 1, an optical network 100 is shown to send data between an endpoint 102 and an endpoint 104. The optical network includes network elements 110, 112, 114, 116, and 118. The endpoint 102 is connected to the optical network 100 through the network element 110. Similarly, the endpoint 104 is connected to the optical network 100 through the network element 118. The network element 110 includes networking logic 120 and trail trace logic 130. The networking logic 120 enables the network element 110 to send and receive optical frames within the optical network 100. The trail trace logic 130 enables the network element 110 to insert TTI information into optical transport frames. In one example, the optical frames are formatted according to a 400ZR protocol or a 400ZR+ protocol. In another example, the network elements 112, 114, 116, and 118 may include similar networking logic and trail trace logic as included in the network element 110.

Figure 2:
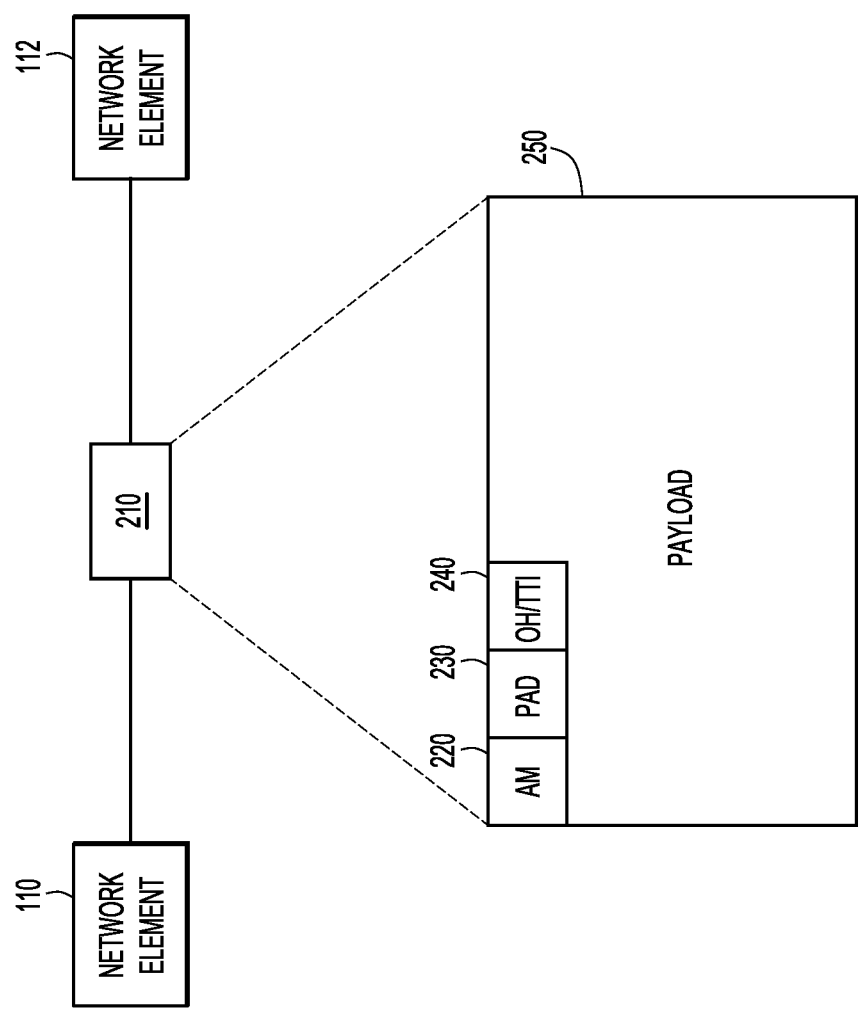
FIG. 2 is a simplified block diagram illustrating an optical frame transmitted between network elements, according to an example embodiment.

Referring now to FIG. 2, a simplified block diagram shows a network element 110 transmitting an optical frame 210 with TTI information to a network element 112. The optical frame 210 is formatted according to a protocol with an alignment marker section 220, a padding section 230, an overhead section 240, and a payload section 250. For instance, the optical frame may be formatted according to a FlexO frame structure with 128 rows and 5140 columns of bits. In the frame structure of the optical frame 210, the alignment marker section 220 may be the first 480 columns of the first row of bits. Additionally, the padding section 230 may be column 481-960 of the first row of bits. Further, the overhead section 240 may be columns 961-1280 of the first row of bits. This frame structure leaves the remaining 656,640 bits for the payload section 250.

The network element 110 includes the TTI information for the optical frame 210 in specified bytes of the overhead section 240. For instance, the network element 110 may include the TTI information in the bytes of the overhead section 240 that are reserved in the FlexO frame structure. Alternatively, the network element 110 may include the TTI information in bytes of the overhead section 240 that are defined in the FlexO protocol, but are not needed for the 400ZR or 400ZR+ protocols, as described hereinafter with respect to FIG. 4.

In one example, the network element 110 may be the source identified in the TTI information and the network element 112 is the destination identified in the TTI information. Alternatively, other network elements in the optical network may be identified as the source and/or destination of optical frame 210.

Figure 3:
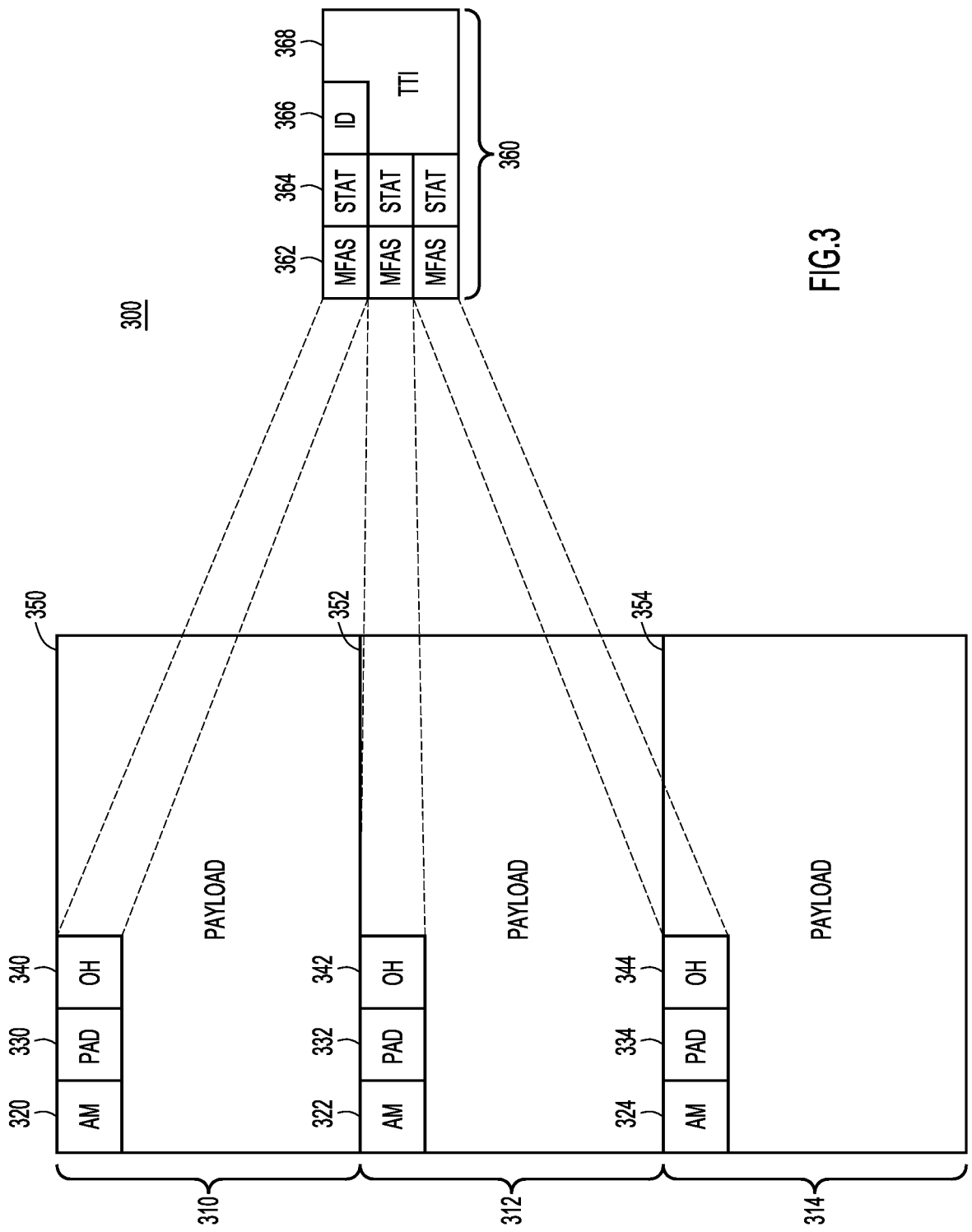
FIG. 3 illustrates a multi-frame structure of optical frames with overhead bytes that include TTI, according to an example embodiment.

Referring now to FIG. 3, a multi-frame structure 300 is shown that may be generated by an optical network element (e.g., network element 110) to communicate with other network elements (e.g., network element 112). The multi-frame structure 300 includes frames 310, 312, and 314 in this example. The number of frames in the multi-frame structure 300 describes in FIG. 3 is used for simplicity and clarity, and is not intended to place any limit or requirement on the number of frames that may be used with the techniques described herein. For instance, in other examples, a multi-frame structure combining eight frames may use the techniques described herein.

The frame 310 includes an alignment marker section 320, a padding section 330, an overhead section 340, and a payload section 350. Similarly, the frames 312 and 314 include alignment marker sections 322 and 324, padding sections 332 and 334, overhead sections 342 and 344, and payload sections 352 and 354, respectively.

The overhead sections 340, 342, and 344 of the multi-frame structure 300 are logically combined in FIG. 3 to more clearly display the components of the overhead sections 340, 342, and 344. Each overhead section 340, 342, and 344 is displayed as a row of the combined overhead 360. Each row of the combined overhead 360 includes a Multi-Frame Alignment Structure (MFAS) 362 and a status byte 364. The first row of the combined overhead 360 also includes one or more identification bytes 366, such as group identification or physical (PHY) member identification. At least part of the remainder of the combined overhead 360 may be used as TTI bytes 368 enabling the optical network to include TTI information for a payload that is not an OTN frame.

In one example, the multi-frame structure 300 is formatted according to a FlexO format with an 8-frame structure. In this example, the network elements may use the three least significant bits of the MFAS 362 to identify the eight frames within the multi-frame structure. The multi-frame structure may also contain seven locations with fixed values in the payload areas of the first seven frames (e.g., in row 65, columns 1-1280 of each payload section). The last frame of the multi-frame structure may not include the same fixed value in the corresponding area of the payload section. Typically, the fixed values are zeroes, and they are not checked at the receiver sink function.

Figure 4:
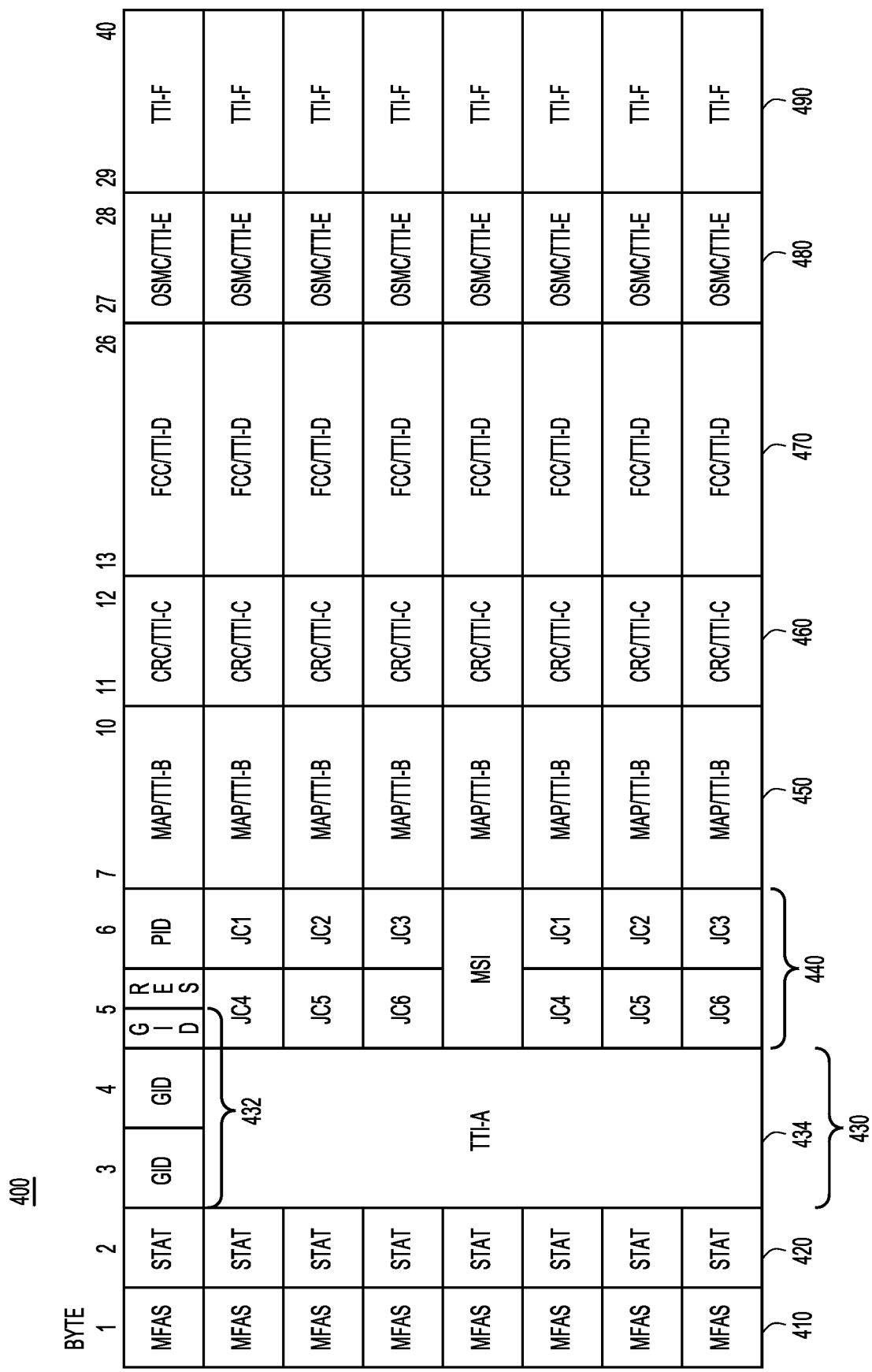
FIG. 4 illustrates the format of overhead bytes in a multi-frame structure with multiple sections available for TTI, according to an example embodiment.

Referring now to FIG. 4, a specific example of a combined overhead 400 is shown with multiple sections for a network element to insert TTI information. The first byte 410 of each row in the combined overhead 400 includes an MFAS corresponding to each row/frame in the multi-frame structure. Similarly, the second byte 420 of each row in the combined overhead 400 includes a status signal corresponding to each row/frame in the multi-frame structure.

The third and fourth bytes comprise section 430 of the combined overhead 400, and include a group identifier 432 in the first row and a TTI section 434 that may be used for TTI information (e.g., TTI-A). The fifth and sixth bytes comprise section 440 of the combined overhead 400, and include more of the group identifier 432, a reserved section, and a PHY/member identifier (PID) in the first row. The second, third, and fourth rows of the section 440 include Justification Control (JC) bytes, which are repeated in the sixth, seventh, and eighth rows of the section 440. The fifth row of the section 440 includes a Multiplex Structure Identifier (MSI).

The seventh through the tenth bytes comprise section 450 of the combined overhead 400, and include PHY/member map values when the multi-frame structure is formatted according to a FlexO protocol. However, a multi-frame structure formatted according to the 400ZR or 400ZR+ protocols does not require PHY/member map values/bytes, and the section 450 may be used for TTI information (e.g., TTI-B).

The eleventh and twelfth bytes comprise section 460 of the combined overhead 400, and include Cyclic Redundancy Check (CRC) values when the multi-frame structure is formatted according to a FlexO protocol. However, a multi-frame structure formatted according to the 400ZR or 400ZR+ protocols does not require CRC values, and the section 460 may be used for TTI information (e.g., TTI-C).

The thirteenth though the twenty-sixth bytes comprise section 470 of the combined overhead 400, and include FlexO Communication Channel (FCC) values when the multi-frame structure is formatted according to a FlexO protocol. However, a multi-frame structure formatted according to the 400ZR or 400ZR+ protocols does not require FCC values, and the section 470 may be used for TTI information (e.g., TTI-D).

The twenty-seventh and twenty-eighth bytes comprise section 480 of the combined overhead 400, and include OTN Synchronization Message Channel (OSMC) values when the multi-frame structure is formatted according to a FlexO protocol. However, a multi-frame structure formatted according to the 400ZR or 400ZR+ protocols does not require OSMC values, and the section 480 may be used for TTI information (e.g., TTI-E).

The twenty-ninth through the fortieth bytes comprise section 490 of the combined overhead 400, and are typically reserved when the multi-frame structure is formatted according to a FlexO protocol. According to the techniques described herein, this reserved section 490 may be used for TTI information (e.g., TTI-F).

In one example, a network element which generates optical network frames formatted according to the 400ZR or 400ZR+ protocol may use some or all of the TTI section 434, 450, 460, 470, 480, or 490 for TTI information. The network element may select one or more TTI sections to include the TTI information based on the amount of TTI information to be included in the optical network frame. For instance, if the TTI information includes a 14-byte source access point identifier, the network element may select the TTI-A section 434. If the TTI information includes a 16-byte source access point identifier, a 16-byte destination access point identifier, and a 32-byte operator specific field, then the network element may select the TTI-F section 490 to insert the TTI information.

In another example, the network element may select one or more rows of multiple sections to provide the TTI information. For instance, if the TTI information includes a 16-byte source access point identifier and a 16-byte destination point identifier, the network element may insert the TTI using only the first row by using sections 450, 460, 470, 480, and 490.

Figure 5:
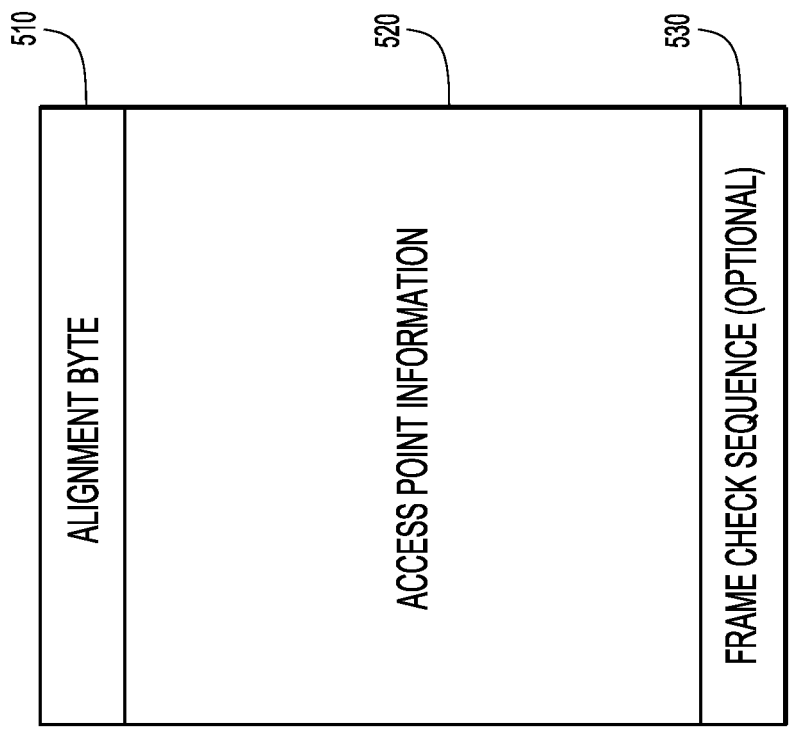
FIG. 5 illustrates the format of the TTI for an optical frame, according to an example embodiment.

Referring now to FIG. 5, a simplified block diagram illustrates an example of TTI information 500. The TTI information 500 includes an initial alignment byte 510, a plurality of bytes for the access point information 520, and an optical Frame check sequence byte 530. The number of bytes in the access point information 520 may vary based on the amount and type of TTI information inserted into the optical network frame.

In one example, the access point information 520 may include a Source Access Point Identifier (SAPI) identifying the source of the optical network frame. In another example, the access point information 520 may include both a SAPI and a Destination Access Point Identifier (DAPI) identifying the destination of the optical network frame. In a further example, the access point information 520 may include a SAPI, a DAPI, and additional information about the optical network that is specific to the network operator.

Figure 6:
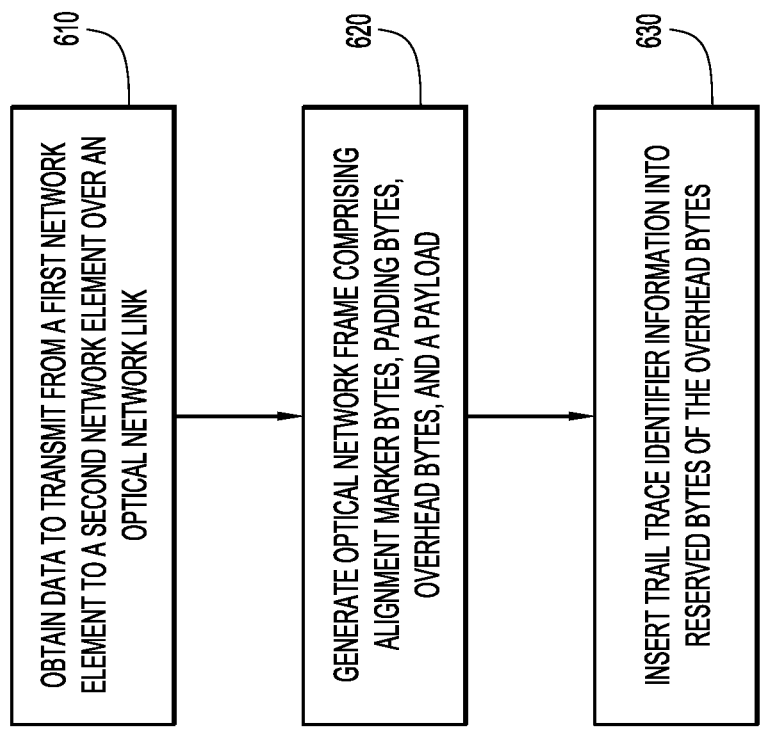
FIG. 6 is a flowchart illustrating operations performed on a network element to include TTI in an optical network frame, according to an example embodiment.

Referring now to FIG. 6, a flowchart illustrates operations performed by a first network element (e.g., network element 110) in a process 600 to insert TTI information into an optical network frame. At 610, the first network element obtains data to transmit to a second network element over an optical network link. In one example, the data may be obtained from an endpoint connected to the first network element. Alternatively, the data may be obtained from another network element in the optical network (e.g., by receiving an optical network frame).

At 620, the network element generates an optical network frame comprising alignment marker bytes, padding bytes, overhead bytes, and payload bytes. The padding bytes follow the alignment marker bytes, and the overhead bytes follow the padding bytes. The overhead bytes include an MFAS byte, a link status byte, and a plurality of reserved bytes. The payload bytes follow the overhead bytes and encode at least a portion of the data to transmit to the second network element.

At 630, the network element inserts trail trace identifier information into the reserved bytes in the overhead bytes. The trail trace identifier information identifies the first network element as the source of the optical network frame. In one example, the trail trace identifier information includes a SAPI associated with the first network element.

Figure 7:
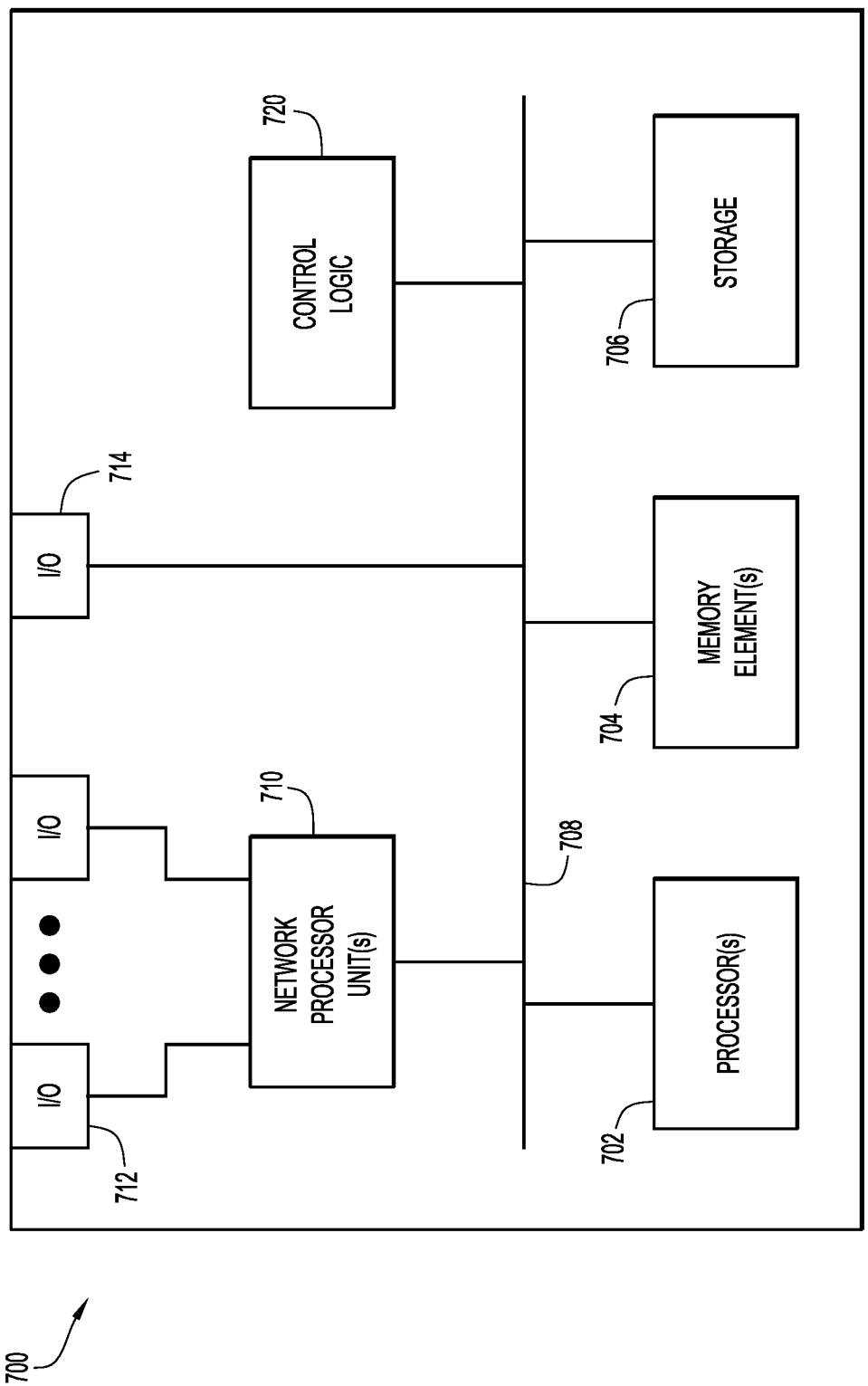
FIG. 7 illustrates a simplified block diagram of a device that may be configured to perform the methods presented herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques described herein provide for inserting TTI information into the overhead of optical network frames that do not transport OTN frames. These techniques provide easy access to source/destination access point identifiers on emergent technologies, such as the 400ZR and 400ZR+ protocols.

In one form, a computer-implemented method is provided for including trail trace identifier information in an optical network frame. The method includes obtaining data at a first network element to transmit over an optical network link to a second network element. The method also includes generating an optical network frame comprising a plurality of alignment marker bytes, which are followed by a plurality of padding bytes. The optical network frame also includes a plurality of overhead bytes following the plurality of padding bytes. The plurality of overhead bytes include an MFAS byte, a link status byte, and a plurality of reserved bytes. The optical network frame also includes a plurality of payload bytes following the plurality of overhead bytes. The plurality of payload bytes encode at least a portion of the data to transmit to the second network element. The method further includes inserting trail trace identifier information into the plurality of reserved bytes in the plurality of overhead bytes. The trail trace identifier information identifies the first network element as a source of the optical network frame.

In another form, an apparatus comprising a network interface and a processor is provided. The network interface is configured to communicate in a computer network. The processor is coupled to the network interface, and configured to obtain data to transmit over an optical network link to a network element. The processor is also configured to generate an optical network frame comprising a plurality of alignment marker bytes followed by a plurality of padding bytes. The optical network frame also includes a plurality of overhead bytes following the plurality of padding bytes. The plurality of overhead bytes include an MFAS byte, a link status byte, and a plurality of reserved bytes. The optical network frame also includes a plurality of payload bytes following the plurality of overhead bytes. The plurality of payload bytes encode at least a portion of the data to transmit to the second network element. The processor is further configured to insert trail trace identifier information into the plurality of reserved bytes in the plurality of overhead bytes. The trail trace identifier information identifies the first network element as a source of the optical network frame.

In still another form, a non-transitory computer readable storage media is provided that is encoded with instructions that, when executed by a processor, cause the processor to obtain data to transmit over an optical network link to a network element. The instructions also cause the processor to generate an optical network frame comprising a plurality of alignment marker bytes followed by a plurality of padding bytes. The optical network frame also includes a plurality of overhead bytes following the plurality of padding bytes. The plurality of overhead bytes include an MFAS byte, a link status byte, and a plurality of reserved bytes. The optical network frame also includes a plurality of payload bytes following the plurality of overhead bytes. The plurality of payload bytes encode at least a portion of the data to transmit to the second network element. The instructions further cause the processor to insert trail trace identifier information into the plurality of reserved bytes in the plurality of overhead bytes. The trail trace identifier information identifies the first network element as a source of the optical network frame.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining data at a first network element to transmit over an optical network link to a second network element;
   generating an optical network frame comprising:
      a plurality of alignment marker bytes;
      a plurality of padding bytes following the plurality of alignment marker bytes;
      a plurality of overhead bytes following the plurality of padding bytes, the plurality of overhead bytes including a Multi-Frame Alignment Signal (MFAS) byte, a link status byte, and a plurality of reserved bytes; and
      a plurality of payload bytes following the plurality of overhead bytes, the plurality of payload bytes encoding at least a portion of the data to transmit to the second network element; and
   inserting trail trace identifier information into the plurality of reserved bytes in the plurality of overhead bytes, the trail trace identifier information identifying the first network element as a source of the optical network frame.

2. The method of claim 1, wherein the plurality of overhead bytes do not include Physical/Member Map bytes, Cyclic Redundancy Check (CRC) bytes, FlexO Communication Channel (FCC) bytes, or Optical Transport Network (OTN) Synchronization Message Channel (OSMC) bytes.

3. The method of claim 1, wherein inserting the trail trace identifier information into the plurality of reserved bytes comprises inserting the trail trace identifier information at least between a seventh and a twenty-eighth byte of the plurality of overhead bytes.

4. The method of claim 1, wherein the optical network frame is formatted according to a 400ZR protocol or a 400ZR+ protocol.

5. The method of claim 1, further comprising generating a multi-frame structure comprising a plurality of optical network frames, wherein the trail trace identifier information identifies the second network element as a destination of the multi-frame structure, and wherein the trail trace identifier information is spread across the overhead bytes in the plurality of optical network frames.

6. The method of claim 1, wherein the trail trace identifier information includes a Source Access Point Identifier (SAPI) and a Destination Access Point Identifier (DAPI).

7. The method of claim 1, further comprising transmitting the data in the optical network frame with the trail trace identifier information identifying the first network element as the source of the optical network frame.

8. An apparatus comprising:
   a network interface configured to communicate in a computer network; and
   a processor coupled to the network interface, the processor configured to:
      obtain data, via the network interface, to transmit over an optical network link to a network element;
      generate an optical network frame comprising:
         a plurality of alignment marker bytes;
         a plurality of padding bytes following the plurality of alignment marker bytes;
         a plurality of overhead bytes following the plurality of padding bytes, the plurality of overhead bytes including a Multi-Frame Alignment Signal (MFAS) byte, a link status byte, and a plurality of reserved bytes; and
         a plurality of payload bytes following the plurality of overhead bytes, the plurality of payload bytes encoding at least a portion of the data to transmit to the network element; and
      insert trail trace identifier information into the plurality of reserved bytes in the plurality of overhead bytes, the trail trace identifier information identifying the apparatus as a source of the optical network frame.

9. The apparatus of claim 8, wherein the plurality of overhead bytes do not include Physical/Member Map bytes, Cyclic Redundancy Check (CRC) bytes, FlexO Communication Channel (FCC) bytes, or Optical Transport Network (OTN) Synchronization Message Channel (OSMC) bytes.

10. The apparatus of claim 8, wherein the processor is configured to insert the trail trace identifier information into the plurality of reserved bytes by inserting the trail trace identifier information at least between a seventh and a twenty-eighth byte of the plurality of overhead bytes.

11. The apparatus of claim 8, wherein the processor is configured to format the optical network frame according to a 400ZR protocol or a 400ZR+ protocol.

12. The apparatus of claim 8, wherein the processor is further configured to generate a multi-frame structure comprising a plurality of optical network frames, wherein the trail trace identifier information identifies the network element as a destination of the multi-frame structure, and wherein the trail trace identifier information is spread across the overhead bytes in the plurality of optical network frames.

13. The apparatus of claim 8, wherein the processor is configured to include a Source Access Point Identifier (SAPI) and a Destination Access Point Identifier (DAPI) in the trail trace identifier information.

14. The apparatus of claim 8, wherein the processor is further configured to cause the network interface to transmit the data in the optical network frame with the trail trace identifier information identifying the apparatus as the source of the optical network frame.

15. One or more non-transitory computer readable storage media encoded with software comprising computer executable instructions and, when the software is executed on a processor of a first network element, the software is operable to cause the processor to:
   obtain data to transmit over an optical network link to a second network element;
   generate an optical network frame comprising:
      a plurality of alignment marker bytes;
      a plurality of padding bytes following the plurality of alignment marker bytes;
      a plurality of overhead bytes following the plurality of padding bytes, the plurality of overhead bytes including a Multi-Frame Alignment Signal (MFAS) byte, a link status byte, and a plurality of reserved bytes; and
      a plurality of payload bytes following the plurality of overhead bytes, the plurality of payload bytes encoding at least a portion of the data to transmit to the second network element; and
   insert trail trace identifier information into the plurality of reserved bytes in the plurality of overhead bytes, the trail trace identifier information identifying the first network element as a source of the optical network frame.

16. The one or more non-transitory computer readable storage media of claim 15, wherein the plurality of overhead bytes do not include Physical/Member Map bytes, Cyclic Redundancy Check (CRC) bytes, FlexO Communication Channel (FCC) bytes, or Optical Transport Network (OTN) Synchronization Message Channel (OSMC) bytes.

17. The one or more non-transitory computer readable storage media of claim 15, wherein the software is further operable to cause the processor to insert the trail trace identifier information into the plurality of reserved bytes by inserting the trail trace identifier information at least between a seventh and a twenty-eighth byte of the plurality of overhead bytes.

18. The one or more non-transitory computer readable storage media of claim 15, wherein the software is further operable to cause the processor to format the optical network frame according to a 400ZR protocol or a 400ZR+ protocol.

19. The one or more non-transitory computer readable storage media of claim 15, wherein the software is further operable to cause the processor to generate a multi-frame structure comprising a plurality of optical network frames, wherein the trail trace identifier information identifies the second network element as a destination of the multi-frame structure, and wherein the trail trace identifier information is spread across the overhead bytes in the plurality of optical network frames.

20. The one or more non-transitory computer readable storage media of claim 15, wherein the software is further operable to cause the processor to transmit the data in the optical network frame with the trail trace identifier information identifying the first network element as the source of the optical network frame.

* * * * *